US009672808B2

(12) United States Patent
Komori et al.

(10) Patent No.: US 9,672,808 B2
(45) Date of Patent: Jun. 6, 2017

(54) INFORMATION PROCESSING APPARATUS, INFORMATION PROCESSING SYSTEM, INFORMATION PROCESSING METHOD, AND PROGRAM

(71) Applicant: SONY CORPORATION, Tokyo (JP)

(72) Inventors: Akihiro Komori, Tokyo (JP); Yusuke Nakagawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 37 days.

(21) Appl. No.: 14/632,084

(22) Filed: Feb. 26, 2015

(65) Prior Publication Data

US 2015/0254947 A1    Sep. 10, 2015

(30) Foreign Application Priority Data

Mar. 7, 2014 (JP) .................................. 2014-045055

(51) Int. Cl.
| H04B 3/36 | (2006.01) |
| G10K 15/12 | (2006.01) |
| G06F 3/01 | (2006.01) |
| H04S 7/00 | (2006.01) |

(52) U.S. Cl.
CPC ............. *G10K 15/12* (2013.01); *G06F 3/016* (2013.01); *H04S 7/305* (2013.01)

(58) Field of Classification Search
CPC ....... G06F 3/016; G06F 3/165; G10H 1/0025; G10H 1/0083
USPC ........ 34/407.1; 345/156; 434/236, 112, 113; 84/746; 340/407.1; 367/116
See application file for complete search history.

(56) References Cited

U.S. PATENT DOCUMENTS

| 6,710,706 | B1* | 3/2004 | Withington | A61F 11/04 340/407.1 |
| 8,754,757 | B1* | 6/2014 | Ullrich | G06F 3/016 340/407.1 |
| 8,754,758 | B1* | 6/2014 | Ullrich | G06F 3/016 340/407.1 |
| 9,449,043 | B2* | 9/2016 | Ullrich | G06F 3/016 |
| 2002/0072816 | A1* | 6/2002 | Shdema | H04L 12/2805 700/94 |
| 2006/0026626 | A1* | 2/2006 | Malamud | G10L 21/00 725/10 |
| 2009/0079813 | A1* | 3/2009 | Hildreth | H04N 7/147 348/14.03 |
| 2010/0062754 | A1* | 3/2010 | Allen | G10L 21/00 455/418 |
| 2011/0003638 | A1* | 1/2011 | Lee | G09B 15/00 463/35 |
| 2011/0061017 | A1* | 3/2011 | Ullrich | G06F 3/016 715/780 |

(Continued)

FOREIGN PATENT DOCUMENTS

JP    2009-072600 A    4/2009

*Primary Examiner* — Hoi Lau
(74) *Attorney, Agent, or Firm* — Chip Law Group (57) ABSTRACT

There is provided an information processing apparatus including an effect control unit configured to control an echo effect that is to be added to an output, a sound output control unit configured to control a sound output according to occurrence of an event in a virtual space, and a haptic output control unit configured to control a haptic output to which the echo effect controlled by the effect control unit is added according to the occurrence of the event.

13 Claims, 8 Drawing Sheets

(56) References Cited

U.S. PATENT DOCUMENTS

| | | | | |
|---|---|---|---|---|
| 2011/0064235 A1* | 3/2011 | Allston | ............... | G10H 1/366 381/63 |
| 2012/0183156 A1* | 7/2012 | Schlessinger | ........... | G06F 3/165 381/111 |
| 2013/0118340 A1* | 5/2013 | D'Amours | ........... | G10H 1/0083 84/746 |
| 2014/0258318 A1* | 9/2014 | Ullrich | ................ | G06F 3/016 707/758 |
| 2014/0362749 A1* | 12/2014 | Nakamoto | ............ | H04L 67/125 370/310 |
| 2015/0070146 A1* | 3/2015 | Cruz-Hernandez | ..... | G06F 3/016 340/407.1 |
| 2015/0070148 A1* | 3/2015 | Cruz-Hernandez | ...... | G08B 6/00 340/407.1 |
| 2015/0093729 A1* | 4/2015 | Plans | ................ | G10H 1/0025 434/236 |
| 2015/0253428 A1* | 9/2015 | Holz | .................. | G01S 17/42 356/5.01 |
| 2015/0254947 A1* | 9/2015 | Komori | ................ | G10K 15/12 340/407.1 |
| 2015/0264432 A1* | 9/2015 | Cheng | ............. | H04N 21/44218 725/10 |
| 2015/0301592 A1* | 10/2015 | Miller | ................ | G06F 3/011 345/156 |
| 2016/0358429 A1* | 12/2016 | Ullrich | ................ | G06F 3/016 |

\* cited by examiner

——·—— OUTPUT AMOUNT
———— ECHO AMOUNT

INFORMATION PROCESSING APPARATUS, INFORMATION PROCESSING SYSTEM, INFORMATION PROCESSING METHOD, AND PROGRAM

CROSS REFERENCE TO RELATED APPLICATIONS

This application claims the benefit of Japanese Priority Patent Application JP 2014-045055 filed Mar. 7, 2014, the entire contents of which are incorporated herein by reference.

BACKGROUND

The present disclosure relates to an information processing apparatus, an information processing system, an information processing method, and a program.

In order to increase a sense of reality of content such as a movie or a video game, a technique to give users a haptic output such as vibrations according to moving images or sounds has been commonly used in recent years. Accordingly, products related to such a technique have been becoming commercially available.

For example, JP 2009-72600A discloses a technique related to an apparatus that monitors audio signals, video signals, data signals, and the like outputted from software, and when these signals satisfy predetermined conditions, outputs sensory control signals to a vibration sensory actuator, for example.

SUMMARY

In general, however, an actuator that performs a haptic output may cause a delay from when receiving an output instruction to when the output is caused. Accordingly, for example, in a case in which output instructions on a moving image output or a sound output and a haptic output are simultaneously made by the occurrence of an event, a time lag may be caused between the moving image output and the haptic output, and the time lag may give a user a feeling of strangeness.

Accordingly, the present disclosure provides an information processing apparatus, an information processing system, an information processing method, and a program which can relieve the user's feeling of strangeness due to an operation delay of a haptic output.

According to an embodiment of the present disclosure, there is provided an information processing apparatus including an effect control unit configured to control an echo effect that is to be added to an output, a sound output control unit configured to control a sound output according to occurrence of an event in a virtual space, and a haptic output control unit configured to control a haptic output to which the echo effect controlled by the effect control unit is added according to the occurrence of the event.

According to another embodiment of the present disclosure, there is provided an information processing system including an effect control unit configured to control an echo effect that is to be added to an output, a sound output control unit configured to control a sound output according to occurrence of an event in a virtual space, and a haptic output control unit configured to control a haptic output to which the echo effect controlled by the effect control unit is added according to the occurrence of the event.

According to another embodiment of the present disclosure, there is provided an information processing method including controlling an echo effect that is to be added to an output, controlling a sound output according to occurrence of an event in a virtual space, and controlling a haptic output to which the echo effect is added according to the occurrence of the event.

According to another embodiment of the present disclosure, there is provided a program for causing a computer to execute an effect control function of controlling an echo effect that is to be added to an output, a sound output control function of controlling a sound output according to occurrence of an event in a virtual space, and a haptic output control function of controlling a haptic output to which the echo effect controlled by the effect control function is added according to the occurrence of the event.

As described above, according to one or more embodiments of the present disclosure, there are provided an information processing apparatus, an information processing system, an information processing method, and a program which can relieve the user's feeling of strangeness due to an operation delay of a haptic output. Note that the effects described above are not limiting. That is, the technology according to the present disclosure can exhibit any of the effects described in the specification or other effects that are apparent from the descriptions in the specification, along with the above effects or instead of the above effects.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. Outline of information processing system according to embodiment of present disclosure
2. First embodiment of present disclosure (example of adding echo effect to haptic output)
  2-1. Configuration of information processing system
  2-2. Processing of information processing system
  2-3. Modification examples
3. Second embodiment of present disclosure (example of adding echo effect in controller)
  3-1. Configuration of information processing system
  3-2. Processing of information processing system
4. Hardware Configuration
5. Conclusion <1. Outline of Information Processing System According to Embodiment of Present Disclosure>

Figure 1:
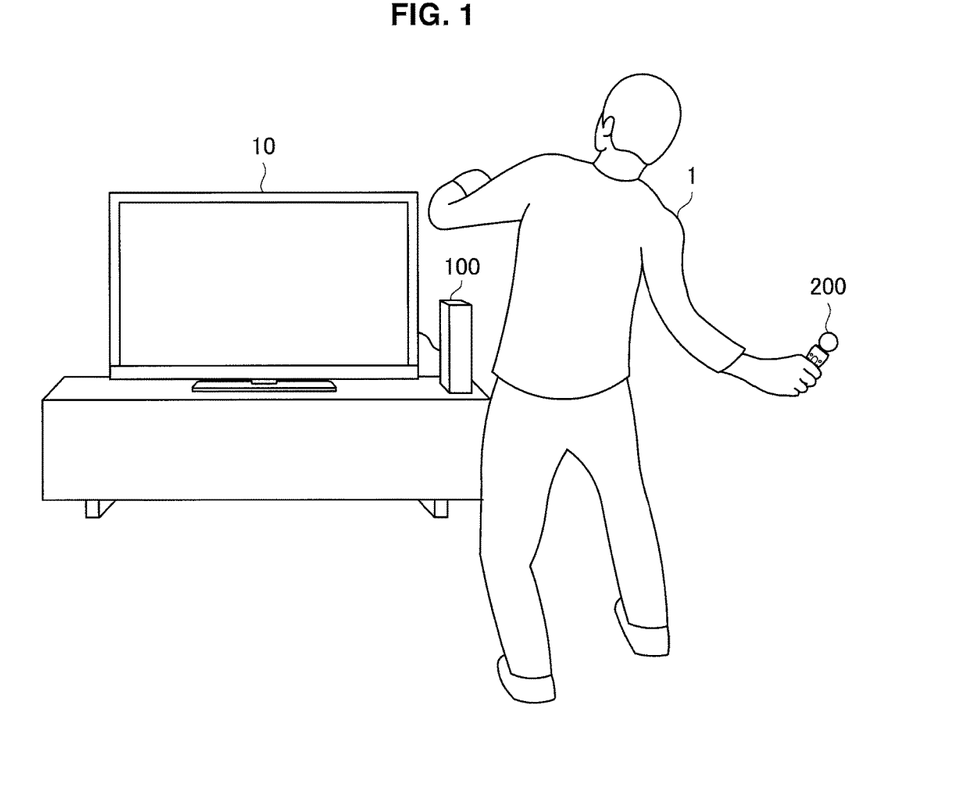
FIG. 1 illustrates an outline of an information processing system according to an embodiment of the present disclosure.

First, an outline of an information processing system according to an embodiment of the present disclosure will be described with reference to FIG. 1. FIG. 1 illustrates the outline of the information processing system according to an embodiment of the present disclosure.

The information processing system includes an information processing apparatus 100 and a controller 200. The information processing apparatus 100 is a stationary apparatus and has a function of performing processing for a virtual space, a function of performing processing of generating information for a haptic output on the basis of the result of the above processing, and a communication function. The controller 200 is a portable apparatus that can be carried and includes an actuator that performs the haptic output and a communication function. Accordingly, in the information processing system, the information processing apparatus 100 generates information for the haptic output based on the result of processing in the virtual space, the generated information is transmitted to the controller 200, and the controller 200 can perform the haptic output on the basis of the received information.

Further, the controller 200 has a function of detecting a user's operation, and transmits information related to the detected operation to the information processing apparatus 100. Further, the information processing apparatus 100 has a function of detecting the distance from a display screen to the user. Accordingly, in the information processing system, the information processing apparatus 100 can perform processing in the virtual space on the basis of the information related to the user's operation and the distance from the display screen to the user, which are detected by the controller 200.

For example, as shown in FIG. 1, the information processing system can be composed of the information processing apparatus 100 connected to a display apparatus 10 and the controller 200 to be operated by a user 1. The information processing apparatus 100 can provide information related to the result of processing for the virtual space, such as a three-dimensional moving image, to the display apparatus 10, and the display apparatus 10 can display the provided moving image. The information processing apparatus 100 can also generate haptic output signals on the basis of the event and the like that have occurred in the virtual space, and can transmit the generated haptic output signals to the controller 200. The controller 200 can operate a haptic output actuator on the basis of the received haptic output signals.

The controller 200 can also detect an operation by the user 1, such as pressing of a button or displacement of the controller 200, and can transmit information related to the detected operation to the information processing apparatus 100. The information processing apparatus 100 can detect the distance from the display apparatus 10 to the user 1, and can perform processing for the virtual space on the basis of the received information and the detected distance.

Here, in general, an actuator that performs a haptic output may cause a delay from when receiving an output instruction to when the output is caused. Accordingly, for example, in a case in which output instructions on a moving image output or a sound output and a haptic output are simultaneously made by the occurrence of an event, a time lag may be caused between the moving image output and the haptic output, and the time lag may give the user a feeling of strangeness. Further, experimental results and the like have revealed that the human's feeling of strangeness with respect to the output delay is relieved by adding an echo effect to the output. Note that the echo refers to a phenomenon that humans continuously feel vibrations, after an output related to vibrations is stopped, by reflection of the outputted vibrations and the like. Accordingly, the information processing system adds the echo effect to the haptic output.

For example, in a case in which an event of hitting a ball occurs in a virtual space, the information processing apparatus 100 generates moving image output signals, sound output signals, and haptic output signals related to a moving image of the hit, the hit sound, and vibrations, respectively. Further, the information processing apparatus 100 adds signals related to the echo effect to the generated haptic output signals. Then, the information processing apparatus 100 transmits the generated moving image output signals to the display apparatus 10, and transmits the sound output signals and the haptic output signals to the controller 200. The display apparatus 10 displays the moving image on the basis of the received moving image output signals, and the controller 200 performs a sound output on the basis of the received sound output signals. The controller 200 also performs a vibration output on the basis of the received haptic output signals, but the vibration output starts later than the display of the moving image of the hit and the output of the hit sound. However, since the controller 200 outputs vibrations to which the echo effect is added, the user is unlikely to feel a delay of vibrations with respect to the moving image of the hit, the hit sound, and the like.

In this manner, the information processing system according to an embodiment of the present disclosure performs a sound output and a haptic output to which the echo effect is added according to the occurrence of an event in the virtual space. Accordingly, in a case in which an operation delay of an actuator related to the haptic output causes the start of the haptic output to be later than the start of the sound output, it becomes possible to relieve the user's feeling of strangeness. Note that the information processing apparatus 100 and the controller 200 according to first and second embodiments are specified by adding numbers corresponding to the number of embodiments to the end of reference numerals, such as an information processing apparatus 100-1 and an information processing apparatus 100-2, for convenience of the description.

<2. First Embodiment of Present Disclosure (example of adding echo effect to haptic output)>

The outline of the information processing system according to an embodiment of the present disclosure has been described above. Next, an information processing system according to the first embodiment of the present disclosure will be described. In the information processing system according to the present embodiment, the information processing apparatus 100-1 adds signals related to the echo effect to the haptic output signals, and a controller 200-1 performs the haptic output on the basis of the haptic output signals to which signals related to the echo effect are added.

[2-1. Configuration of Information Processing System]

Figure 2:
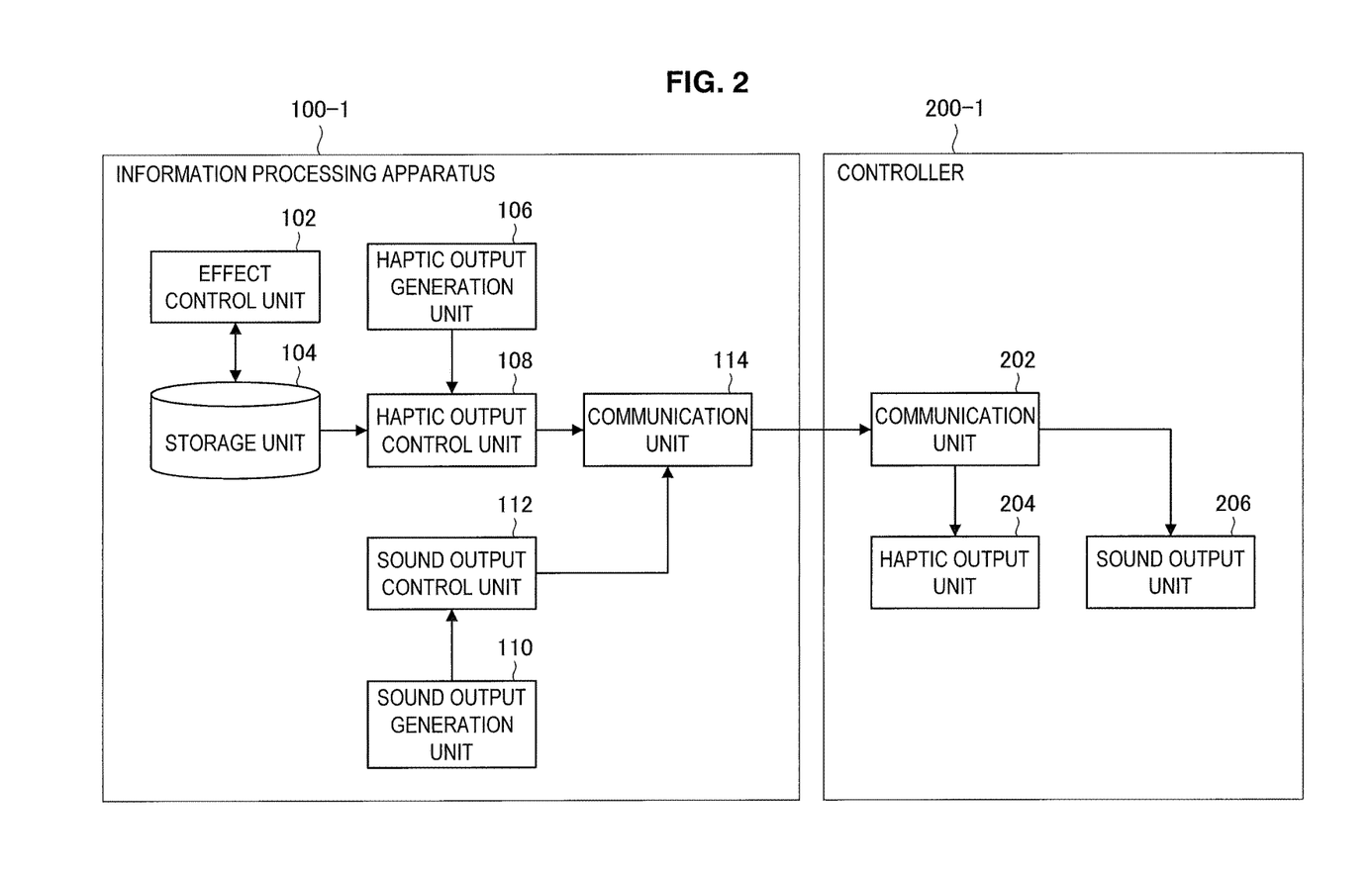
FIG. 2 is a block diagram showing a schematic functional configuration of an information processing system according to a first embodiment of the present disclosure.

First, a configuration of the information processing system according to the first embodiment of the present disclosure will be described with reference to FIG. 2. FIG. 2 is a block diagram showing a schematic functional configuration of the information processing system according to the present embodiment.

The information processing system includes the information processing apparatus 100-1 and the controller 200-1 as shown in FIG. 2.

The information processing apparatus 100-1 includes an effect control unit 102, a storage unit 104, a haptic output generation unit 106, a haptic output control unit 108, a sound output generation unit 110, a sound output control unit 112, and a communication unit 114.

Figure 3:
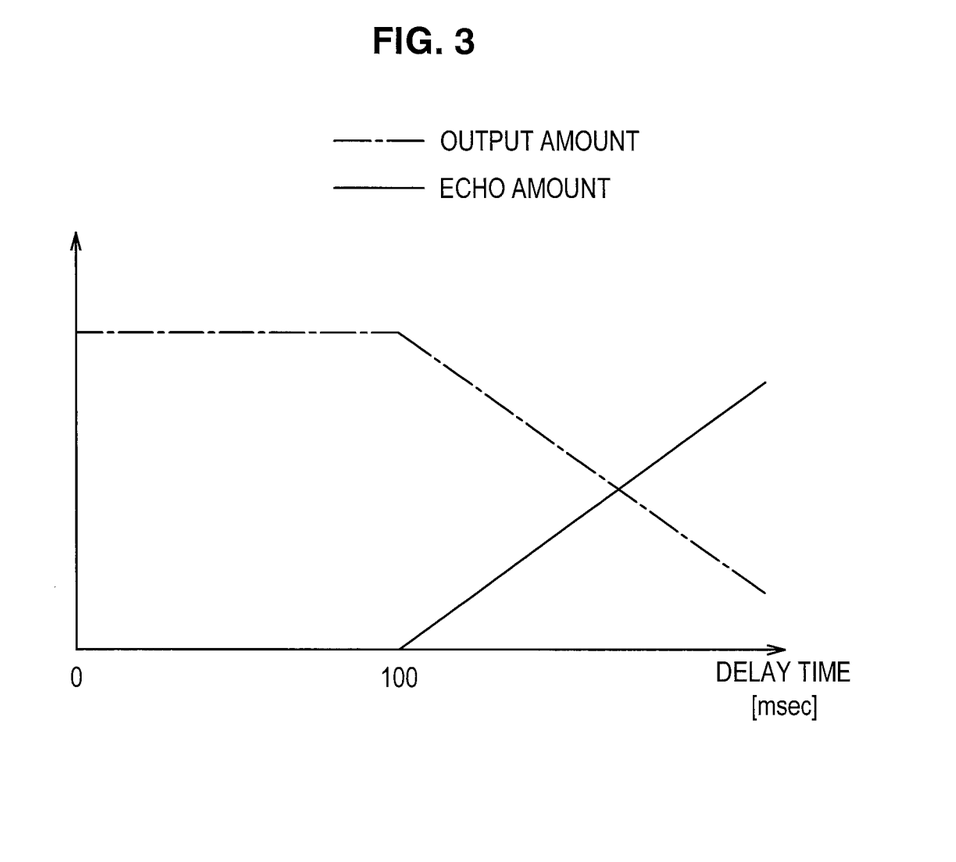
FIG. 3 shows a relation among an echo amount, an output amount of a haptic output, and a delay time in processing performed by an information processing apparatus according to the embodiment.

The effect control unit 102 controls the echo effect that is to be added to the haptic output. Specifically, the effect control unit 102 controls the echo effect on the basis of a delay time from an output start instruction on the haptic output to the occurrence of the output. For example, the effect control unit 102 can increase or decrease the effect amount of the echo effect (hereinafter also referred to as echo amount) on the basis of the delay time. Details of the control processing of the echo effect will be described with reference to FIG. 3. FIG. 3 shows a relation among the echo amount, the output amount of the haptic output, and the delay time in the processing performed by the information processing apparatus 100 according to the present embodiment.

First, in many cases, the delay time from the output start instruction on the haptic output to the occurrence of the output is defined by the type or product of the actuator that performs the haptic output. Accordingly, the delay time can be stored in the storage unit 104, for example. Then, the effect control unit 102 can acquire the delay time from the storage unit 104.

Next, the effect control unit 102 decides the presence or absence of the echo effect on the basis of the acquired delay time and a certain threshold. Specifically, in a case in which the acquired delay time is longer than the certain threshold, the effect control unit 102 decides that signals related to the echo effect are added to the haptic output signals. Note that the certain threshold can be a period of time by which humans begin to feel a delay, such as 100 msec.

Further, in a case in which the echo effect is decided to be added, the effect control unit 102 increases or decreases the echo amount according to the acquired delay time. Specifically, in a case in which the delay time is longer than the certain threshold, the effect control unit 102 increases the echo amount in proportion to the increase in the delay time. For example, as shown in a graph of the echo amount shown in FIG. 3, when the delay time becomes 100 msec or more, the effect control unit 102 can add the echo effect, and can increase the echo amount according to the increase in the delay time. Then, the effect control unit 102 can cause the storage unit 104 to store the decided echo amount. Note that the effect control unit 102 may acquire a fixed value corresponding to the delay time and may decide the echo amount. For example, the fixed value can be stored in the storage unit 104 as the value of a database in which the delay time is associated with the fixed value.

In this manner, the effect control unit 102 controls the echo effect on the basis of the delay time from the output start instruction on the haptic output to the occurrence of the output. Accordingly, since the echo effect according to the delay time is added, it becomes possible to increase the force of the echo effect. Further, the effect control unit 102 decides the presence or absence of the echo effect on the basis of the delay time and the certain threshold. Accordingly, since the echo effect is added only in a case in which the echo effect is useful, it becomes possible to reduce a load by processing of adding the echo effect. Furthermore, the effect control unit 102 increases or decreases the echo amount on the basis of the delay time. Accordingly, since the echo amount with few excess and deficiency with respect to the delay time is decided, it becomes possible to further increase the force of the echo effect.

Note that the echo amount may be a fixed value. For example, the echo amount can be stored in the storage unit 104 in advance. In this case, it becomes possible to reduce processing related to the decision on the echo effect and to reduce computational resources and processing load.

Here, referring to FIG. 2 again, the configuration of the information processing apparatus 100-1 will be described again. The storage unit 104 stores the delay time and the echo amount decided by the effect control unit 102. Note that the delay time is stored in the storage unit 104 in advance, but may be changed via an input unit that is also included in the information processing apparatus 100-1.

The haptic output generation unit 106 generates the haptic output signals according to the occurrence of an event in the virtual space. Specifically, in a case in which an event occurs in the virtual space, a haptic output instruction is generated by an application that performs processing for the virtual space, and the haptic output generation unit 106 generates the haptic output signals on the basis of the generated haptic output instruction.

The haptic output control unit 108 controls the haptic output signals. Specifically, the haptic output control unit 108 acquires the echo amount from the storage unit 104, and adds signals related to the echo effect of the acquired echo amount to the haptic output signals generated by the haptic output generation unit 106. For example, the haptic output control unit 108 can set the value of the acquired echo amount for an echo effect addition filter, and can add signals related to the echo effect by using the echo effect addition filter on the haptic output signals.

Further, in a case in which the delay time exceeds the certain threshold, the haptic output control unit 108 decreases the haptic output. Specifically, the haptic output control unit 108 acquires the delay time from the storage unit 104, and in a case in which the acquired delay time exceeds the certain threshold, the haptic output control unit 108 decreases the output amount of the haptic output. For example, in a case in which the delay time exceeds 100 msec, which is the certain threshold, the haptic output control unit 108 can decrease the output amount of the haptic output, as shown in FIG. 3. Further, the haptic output control unit 108 can decrease the output amount according to the increase in the delay time. Accordingly, since the user's sensitivity to the haptic output is decreased, it becomes possible to decrease the user's sensitivity to the delay of the haptic output.

Further, the haptic output control unit 108 decreases the haptic output according to the echo amount. Specifically, the haptic output control unit 108 decides the haptic output on the basis of such a relation that an increase in the echo amount decreases the output amount of the haptic output. For example, when the echo amount is increased, the haptic output control unit 108 decreases the signal intensity of the haptic output signals. Accordingly, since the lengthening of the total time of the haptic output and the haptic output related to the echo effect is prevented, it becomes possible to suppress an increase in the user's sensitivity to the delay of the haptic output.

The sound output generation unit 110 generates the sound output signals according to the occurrence of an event in the virtual space as a sound output control unit. Specifically, in a case in which an event occurs in the virtual space, a sound output instruction is generated by an application that performs processing for the virtual space, and the sound output generation unit 110 generates the sound output signals on the basis of the generated sound output instruction.

The sound output control unit 112 causes the communication unit 114 to transmit the generated sound output signals. Specifically, when the sound output signals are generated by the sound output generation unit 110, the sound output control unit 112 instructs the communication unit 114 to transmit the sound output signals.

The communication unit 114 transmits the haptic output signals and the sound output signals to the controller 200-1. Specifically, on the basis of a transmission instruction from the haptic output control unit 108, the communication unit 114 transmits the haptic output signals to which the echo effect is added by the haptic output generation unit 106, and on the basis of a transmission instruction from the sound output control unit 112, the communication unit 114 transmits the sound output signals generated by the sound output generation unit 110. For example, the communication unit 114 can communicate with the controller 200-1 by radio communication such as Bluetooth (registered trademark) communication, Wi-Fi (registered trademark) communication, or infrared light communication, or wired communication via a wire or the like.

The controller 200-1 includes a communication unit 202, a haptic output unit 204, and a sound output unit 206, as shown in FIG. 2.

The communication unit 202 receives the haptic output signals and the sound output signals transmitted from the information processing apparatus 100-1.

The haptic output unit 204 performs the haptic output on the basis of the received haptic output signals. Specifically, the haptic output unit 204 generates vibrations that can be sensed by humans by haptic perception. For example, the haptic output unit 204 can be a vibration actuator such as an eccentric motor or a linear resonant actuator (LRA) and can generate vibrations by operating a built-in motor, coil, or the like on the basis of a waveform related to the received haptic output signals.

The sound output unit 206 performs the sound output on the basis of the received sound output signals. For example, the sound output unit 206 can be a speaker.

Figure 4:
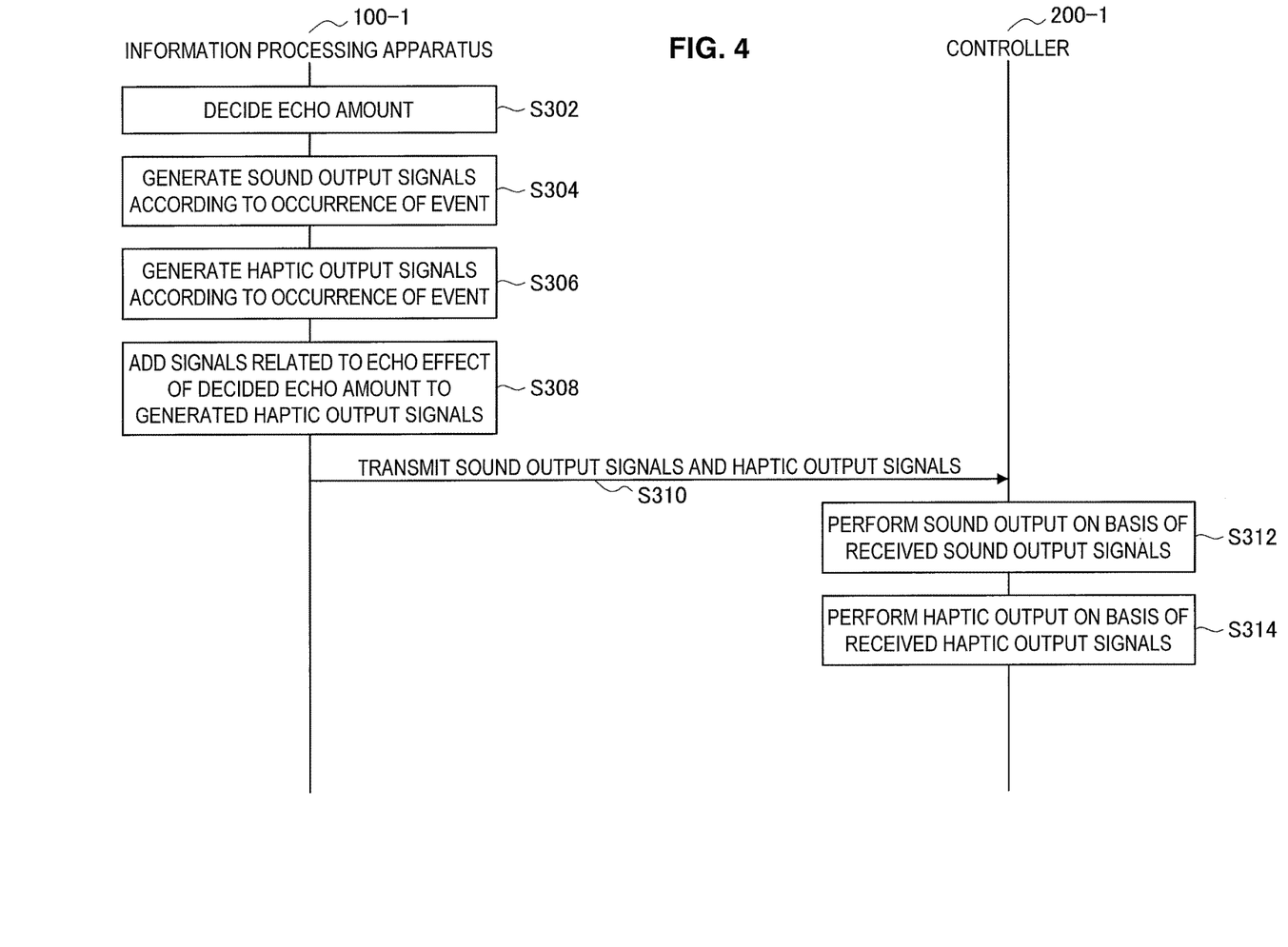
FIG. 4 is a sequence diagram conceptually showing processing of an information processing system according to the embodiment.

[2-2. Processing of Information Processing System]
Next, processing of the information processing system in the present embodiment will be described with reference to FIG. 4. FIG. 4 is a sequence diagram conceptually showing the processing of the information processing system according to the present embodiment.

First, the information processing apparatus 100-1 decides the echo amount (step S302). Specifically, the effect control unit 102 acquires the delay amount that is to be stored in the storage unit 104, and decides the echo amount on the basis of the acquired delay amount. Then, the effect control unit 102 stores the decided echo amount in the storage unit 104.

Next, the information processing apparatus 100-1 generates the sound output signals according to the occurrence of an event (step S304). Specifically, the sound output generation unit 110 generates the sound output signals on the basis of the sound output instruction generated by an application that performs processing for the virtual space.

Next, the information processing apparatus 100-1 generates the haptic output signals according to the occurrence of the event (step S306). Specifically, the haptic output generation unit 106 generates the haptic output signals on the basis of the haptic output instruction generated by an application that performs processing for the virtual space.

Next, the information processing apparatus 100-1 adds signals related to the echo effect of the decided echo amount to the generated haptic output signals (step S308). Specifically, the haptic output control unit 108 acquires the echo amount from the storage unit 104, and adds signals related to the echo effect of the acquired echo amount to the haptic output signals generated by the haptic output generation unit 106.

Next, the information processing apparatus 100-1 transmits the sound output signals and the haptic output signals to the controller 200-1 (step S310). Specifically, the communication unit 114 transmits the sound output signals and the haptic output signals to the controller 200-1 on the basis of the transmission instructions of the sound output control unit 112 and the haptic output control unit 108.

Then, the controller 200-1 performs the sound output on the basis of the received sound output signals (step S312). Specifically, the sound output unit 206 performs the sound output on the basis of the sound output signals received by the communication unit 202.

Further, the controller 200-1 performs the haptic output on the basis of the received haptic output signals (step S314). Specifically, the haptic output unit 204 performs the haptic output on the basis of the haptic output signals received by the communication unit 202.

In this manner, according to the first embodiment of the present disclosure, the information processing system controls the echo effect added to the haptic output, performs the sound output according to the occurrence of an event in the virtual space, and performs the haptic output to which the echo effect is added according to the occurrence of the event. Accordingly, since the user's sensitivity to the delay of the haptic output with respect to the sound output is decreased, it becomes possible to relieve the user's feeling of strangeness with respect to the haptic output.

[2-3. Modification Examples]
The first embodiment of the present disclosure has been described above. Note that the present embodiment is not limited to the above example. First to third modification examples of the present embodiment will be described below.

Figure 5:
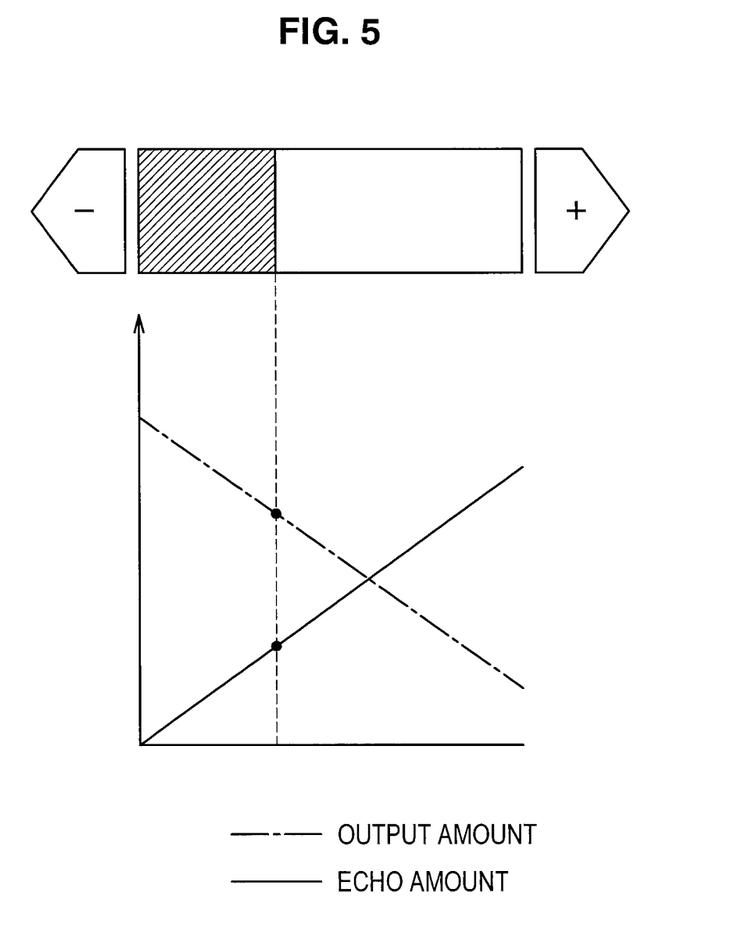
FIG. 5 shows an example of a GUI provided for a user by an information processing apparatus according to a first modification example of the embodiment.

(First Modification Example)
As the first modification example of the present embodiment, the effect control unit 102 may decide the echo amount on the basis of a user's operation. Specifically, the information processing apparatus 100-1 also provides a graphical user interface (GUI) to the user, and a setting value related to the echo amount is stored in the storage unit 104 by a user's operation via the GUI. Then, the effect control unit 102 decides the echo amount by using the setting value stored in the storage unit 104. For example, the setting of the echo amount by the user's operation will be described with reference to FIG. 5. FIG. 5 shows an example of the GUI provided for the user by the information processing apparatus 100-1 according to the first modification example of the present embodiment.

The GUI provided by the information processing apparatus 100-1 includes an operation object that changes the setting value of the echo amount of the haptic output and an information object that visually indicates the echo amount corresponding to the setting value. For example, the setting object of the GUI can be plus and minus buttons shown in an upper part of FIG. 5, and the information object can be a graph of the echo amount indicated in a lower part of FIG. 5. Further, as shown in the upper part of FIG. 5, something like a gauge indicating the setting value can be displayed between the plus button and the minus button. Note that the setting value indicated by the gauge can coordinate with a line showing the setting state of the echo amount in the graph. For example, when the user presses the plus button, the setting value of the gauge is moved to the plus direction, and the line in the graph is moved to the right. Note that the relation between the setting value and the echo amount, that is, the shape of the graph, may also be changed by the user. For example, the inclination of the graph may be changed by a user's operation.

In this manner, according to the first modification example of the present embodiment, the effect control unit 102 decides the echo amount on the basis of the user's operation. Accordingly, since the echo amount is changed on the basis of the setting value that is set by the user's operation, it becomes possible to increase the convenience of the user.

Note that the output amount of the haptic output may be set by an operation on the GUI. Specifically, a user's operation via the GUI causes the setting value related to the output amount of the haptic output to be stored in the storage unit 104. Then, the haptic output control unit 108 decides the output amount of the haptic output by using the setting value stored in the storage unit 104. For example, as shown in FIG. 5, in coordination with the setting of the echo amount, the output amount of the haptic output may be set. In this case, since the output amount is set automatically according to the setting of the echo amount, it becomes possible to further increase the convenience of the user. Note that the output amount of the haptic output may be set independently of the echo amount.

(Second Modification Example)

As the second modification example of the present embodiment, the effect control unit 102 may decide the echo amount according to the output amount of the haptic output. Specifically, the effect control unit 102 decides the echo amount according to the signal intensity of the haptic output signals generated by the haptic output generation unit 106, and haptic output control unit 108 adds the echo effect to the haptic output on the basis of the decided echo amount. For example, the effect control unit 102 can decide the echo amount by using a function and the like by which the echo amount is specified from the signal intensity of the haptic output signals. For example, when the signal intensity of the haptic output signals is high, the echo amount is increased.

In this manner, as the second modification example of the present embodiment, the effect control unit 102 decides the echo amount according to the output amount of the haptic output. Accordingly, since the echo amount that is fit with the output amount of the haptic output can be decided, it becomes possible to increase the effectivity of the echo effect.

(Third Modification Example)

As the third modification example of the present embodiment, the sound output control unit 112 may add the echo effect controlled by the effect control unit 102 to the sound output. Specifically, the effect control unit 102 decides the echo amount of the sound output and stores the decided echo amount of the sound output in the storage unit 104. Then, the sound output control unit 112 acquires the echo amount of the sound output from the storage unit 104, and adds the acquired echo amount of the sound output to the sound output signals generated by the sound output generation unit 110. For example, the sound output control unit 112 can set the value of the acquired echo amount for the echo effect addition filter, and can add the echo effect by using the echo effect addition filter on the sound output signals.

In this manner, according to the third modification example of the present embodiment, the sound output control unit 112 adds the echo effect controlled by the effect control unit 102 to the sound output. Accordingly, since the sound output related to the echo effect can be overlapped with the haptic output that is started later than the sound output, it becomes possible to further relieve the user's feeling of strangeness with respect to the delay of the haptic output.

<3. Second Embodiment of Present Disclosure (example of adding echo effect in controller)>

Next, an information processing system according to the second embodiment of the present disclosure will be described. In the information processing system according to the present embodiment, the information processing apparatus 100-2 decides the echo amount of the haptic output, the decided echo amount is transmitted to the controller 200-2, and the controller 200-2 adds signals related to the echo effect to the haptic output signals.

[3-1. Configuration of Information Processing System]

Figure 6:
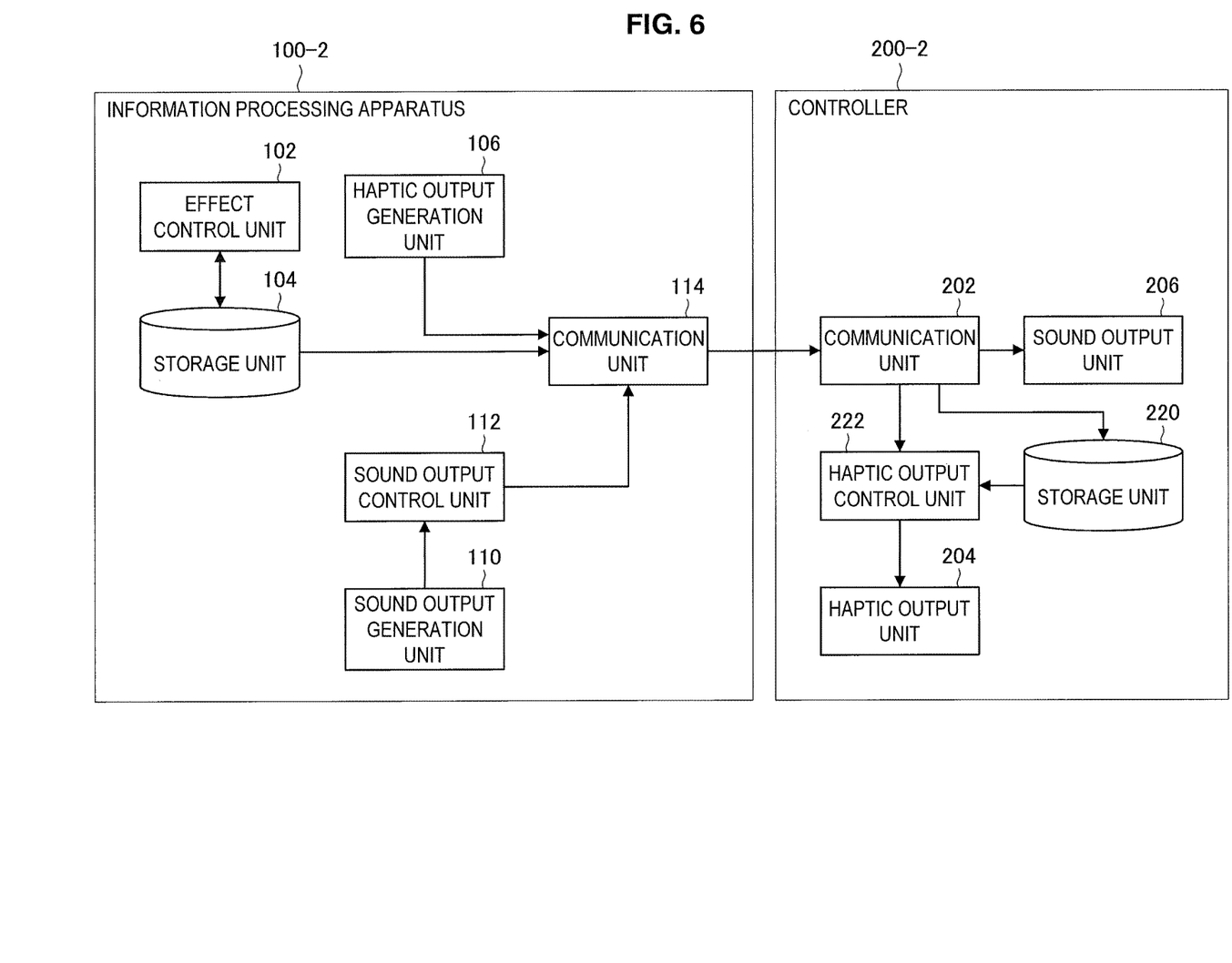
FIG. 6 is a block diagram showing a schematic functional configuration of an information processing system according to a second embodiment of the present disclosure.

First, a configuration of the information processing system according to the second embodiment of the present disclosure will be described with reference to FIG. 6. FIG. 6 is a block diagram showing a schematic functional configuration of the information processing system according to the present embodiment.

As shown in FIG. 6, the information processing apparatus 100-2 includes the effect control unit 102, the storage unit 104, the haptic output generation unit 106, the sound output generation unit 110, the sound output control unit 112, and the communication unit 114.

The communication unit 114 transmits the echo amount that is to be stored in the storage unit 104 to the controller 200-2. Specifically, when a communication with the controller 200-2 is established, the communication unit 114 acquires the echo amount from the storage unit 104, and transmits the acquired echo amount to the controller 200-2. Further, when the haptic output generation unit 106 generates the haptic output signals, the communication unit 114 transmits the haptic output signals to the controller 200-2.

Further, as shown in FIG. 6, the controller 200-2 includes, in addition to the communication unit 202, the haptic output unit 204, and the sound output unit 206, a storage unit 220 and a haptic output control unit 222.

The storage unit 220 stores the echo amount received by the communication unit 202.

The haptic output control unit 222 adds signals related to the echo effect to the haptic output signals received by the communication unit 202. Specifically, when receiving the haptic output signals, the haptic output control unit 222 acquires the echo amount from the storage unit 220, and adds signals related to the echo effect to the received haptic output signals on the basis of the acquired echo amount.

Note that the haptic output control unit 222 may add the echo effect to the haptic output according to a user's operation. Specifically, on the basis of input information that is inputted via an operation unit that is also included in the controller 200-2, the haptic output control unit 222 determines to add signals related to the echo effect to the haptic output signals or not to add the signals. For example, in a case in which the button of the controller 200-2 is pressed, the haptic output control unit 222 can add signals related to the echo effect to the received haptic output signals. In this case, when the echo effect is added by a user's operation, the echo effect can be added in a case in which the user is considered to have high attention, and the processing of adding the echo effect can be optimized.

[3-2. Processing of Information Processing System]

Figure 7:
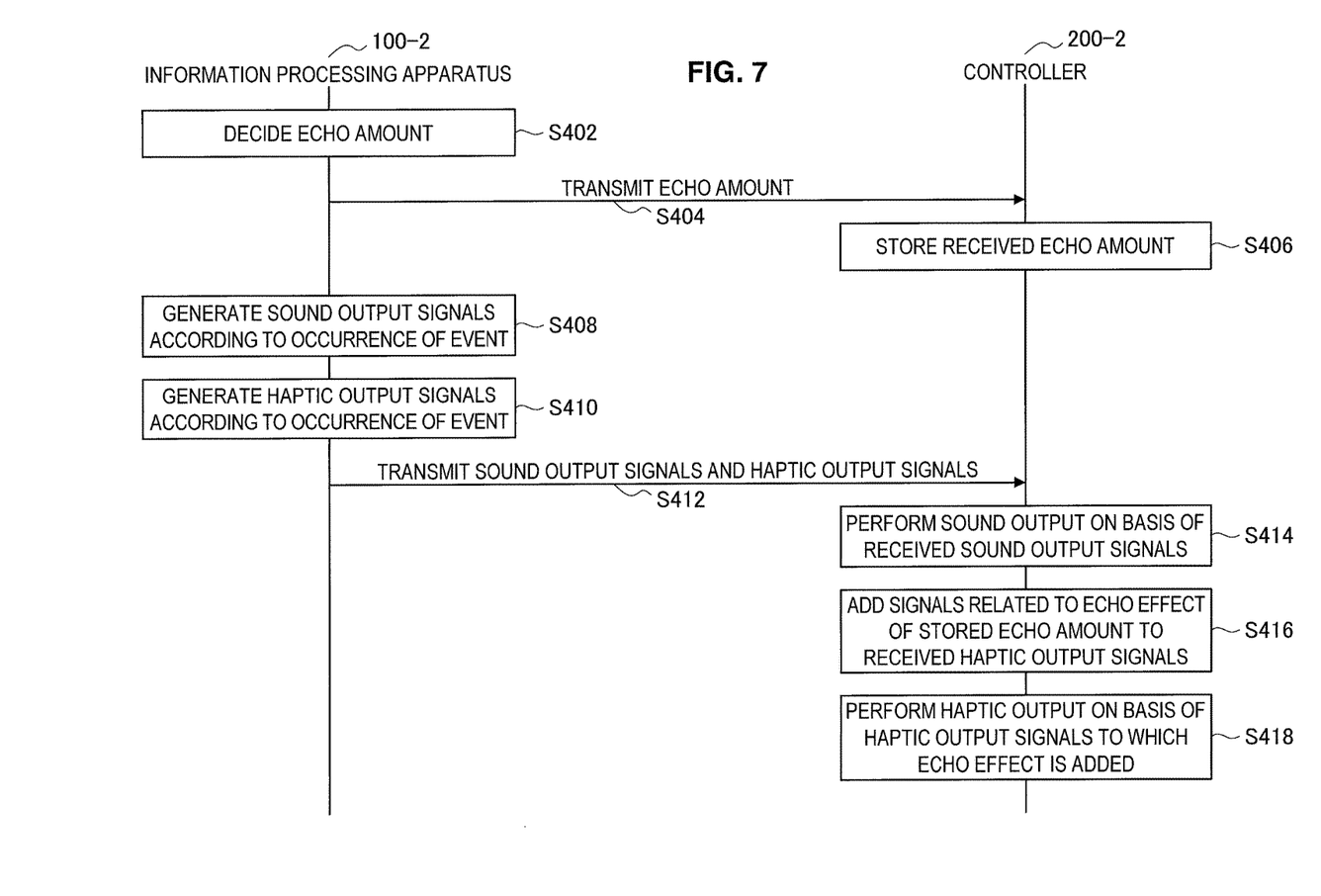
FIG. 7 is a sequence diagram conceptually showing processing of an information processing system according to the embodiment.

Next, processing of the information processing system in the present embodiment will be described with reference to FIG. 7. FIG. 7 is a sequence diagram conceptually showing the processing of the information processing system according to the present embodiment. Note that a detailed description of processing that is substantially the same as that of the information processing system in the first embodiment will be omitted.

First, the information processing apparatus 100-2 decides the echo amount (step S402). Specifically, the information processing apparatus 100-2 performs substantially the same processing as in the step S302 in the first embodiment.

Next, the information processing apparatus 100-2 transmits the echo amount to the controller 200-2 (step S404). Specifically, when a communication with the controller 200-2 is established, the communication unit 114 transmits the echo amount that is to be stored in the storage unit 104 to the controller 200-2.

The controller 200-2 causes the received echo amount to be stored (step S406). Specifically, the communication unit 202 causes the received echo amount to be stored in the storage unit 220.

Next, the information processing apparatus 100-2 generates the sound output signals according to the occurrence of an event (step S408). Specifically, the information processing apparatus 100-2 performs substantially the same processing as in the step S304 in the first embodiment.

Next, the information processing apparatus 100-2 generates the haptic output signals according to the occurrence of the event (step S410). Specifically, the information processing apparatus 100-2 performs substantially the same processing as in the step S306 in the first embodiment.

Next, the information processing apparatus 100-2 transmits the sound output signals and the haptic output signals to the controller 200-2 (step S412). Specifically, the information processing apparatus 100-2 performs substantially the same processing as in the step S310 in the first embodiment.

The controller 200-2 performs the sound output on the basis of the received sound output signals (step S414). Specifically, the controller 200-2 performs substantially the same processing as in the step S312 in the first embodiment.

Further, the controller 200-2 adds signals related to the echo effect of the stored echo amount to the received haptic output signals (step S416). Specifically, the haptic output control unit 222 acquires the echo amount that is stored in the storage unit 220, and adds signals related to the echo effect to the received haptic output signals on the basis of the acquired echo amount.

Next, the controller 200-2 performs the haptic output on the basis of the received haptic output signals to which the echo effect is added (step S418). Specifically, the controller 200-2 performs substantially the same processing as in the step S314 in the first embodiment.

In this manner, according to the second embodiment of the present disclosure, the echo amount decided by the information processing apparatus 100-2 is transmitted to the controller 200-2, and the controller 200-2 adds signals related to the echo effect to the haptic output signals.

Accordingly, since the processing of adding the echo effect in the information processing apparatus 100-2 becomes unnecessary, it becomes possible to reduce computational resources and processing load of the information processing apparatus 100-2.

<4. Hardware Configuration>

Embodiments of the present disclosure have been described above. The processing of the information processing apparatus 100 described above is implemented by cooperation between software and hardware of the information processing apparatus 100 described below.

Figure 8:
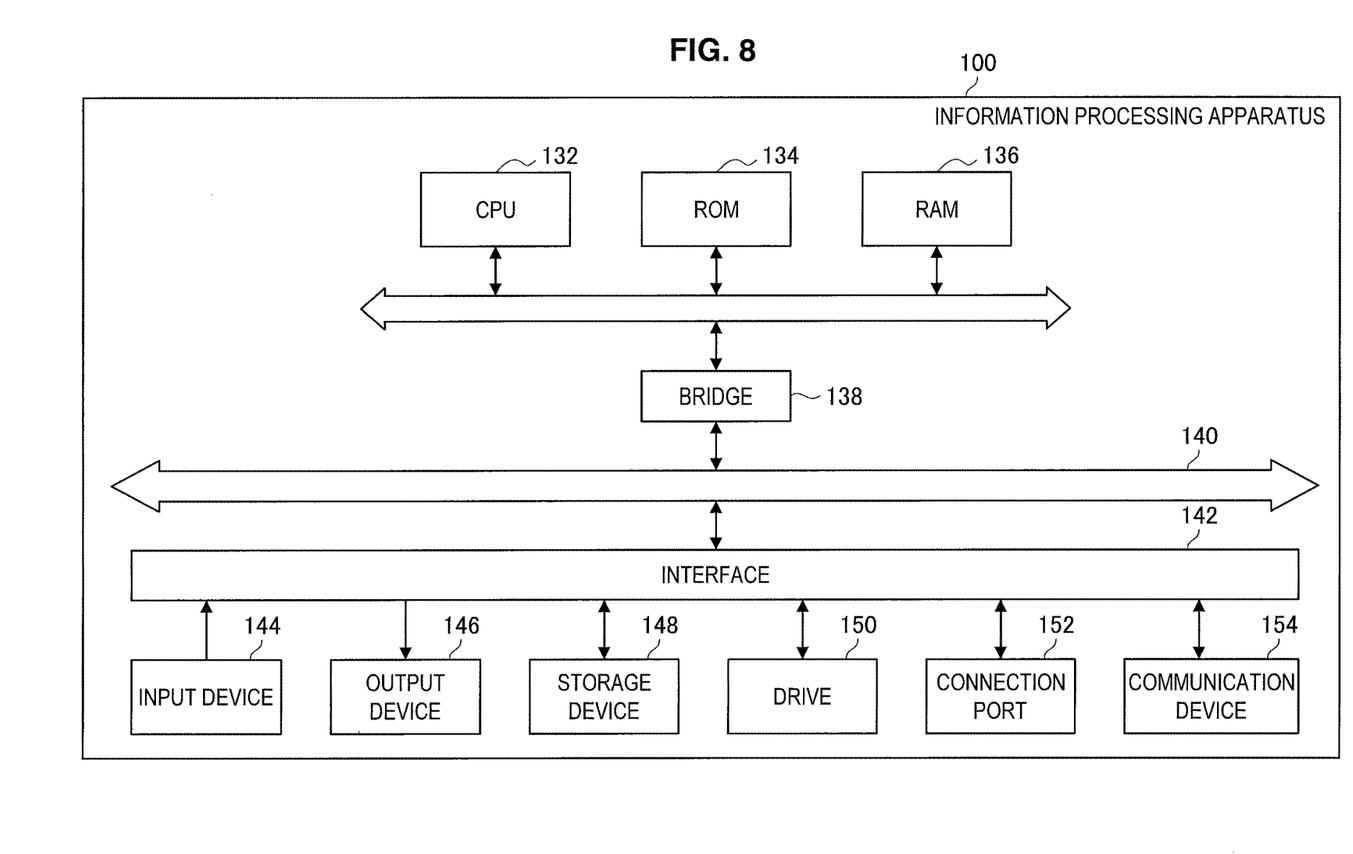
FIG. 8 is an explanatory diagram showing a hardware configuration of an information processing apparatus according to an embodiment of the present disclosure.

FIG. 8 is an explanatory diagram showing a hardware configuration of the information processing apparatus 100 according to an embodiment of the present disclosure. As illustrated in FIG. 8, the information processing apparatus 100 includes a central processing unit (CPU) 132, read only memory (ROM) 134, random access memory (RAM) 136, a bridge 138, a bus 140, an interface 142, an input device 144, an output device 146, a storage device 148, a drive 150, a connection port 152, and a communication device 154.

The CPU 132 functions as an arithmetic processing device and a control device and cooperates with various programs to thereby realize the operations of the effect control unit 102, the haptic output generation unit 106, the haptic output control unit 108, the sound output generation unit 110, and the sound output control unit 112 in the information processing apparatus 100. The CPU 132 may be a microprocessor. The ROM 134 stores programs, operation parameters, or the like to be used by the CPU 132. The RAM 136 temporarily stores programs for use in the execution of the CPU 132, parameters which change as appropriate in the execution, and the like. By the ROM 134 and the RAM 136, a part of the storage unit 104 in the information processing apparatus 100 is realized. The CPU 132, the ROM 134, and the RAM 136 are connected to each other through an internal bus constituted by a CPU bus and the like.

The input device 144 is constituted by, for example, an input unit which allows the user to input information, such as a mouse, a keyboard, a touch panel, a button, a microphone, a switch, and a lever, an input control circuit which generates an input signal based on an input by the user, and then outputs the signal to the CPU 132, and the like. The user of the information processing apparatus 100 can operate the input device 144 to input various data to the information processing apparatus 100 or instruct the information processing apparatus 100 to perform a processing operation.

The output device 146 performs an output operation to a device, such as a liquid crystal display (LCD), an organic light emitting diode (OLED), and a lamp. Furthermore, the output device 146 may include a loudspeaker and a headphone for outputting sounds.

The storage device 148 is a device for data storage. The storage device 148 may include a storage medium, a recording device for recording data in the storage medium, a reading device for reading the data from the storage medium, and a deleting device for deleting data recorded in the storage medium. The storage device 148 stores a program executed by the CPU 132 and various types of data.

The drive 150 is a reader-writer for a storage medium and is built in or externally attached to the information processing apparatus 100. The drive 150 reads out information recorded on a removable storage medium that is attached thereto, such as a magnetic disk, an optical disk, a magneto-optical disk, or a semiconductor memory, and then outputs the information to the RAM 134. The drive 150 is also able to write information to a removable storage medium.

The connection port 152 is a bus for connection with an information processing apparatus or peripheral devices provided outside the information processing apparatus 100. The connection port 152 may be universal serial bus (USB).

The communication device 154 is, as an example of the communication unit 114 of the information processing apparatus 100, a communication interface constituted by a communication device for connection with a network. The communication device 154 may be an infrared communication compatible device, a wireless local area network (LAN) compatible communication device, a long-term evolution (LTE) compatible communication device, or a wired communication device that performs communication through wire.

<5. Conclusion>

As described above, according to the first embodiment of the present disclosure, by decreasing the user's sensitivity to the delay of the haptic output with respect to the sound output, it becomes possible to relieve the user's feeling of strangeness with respect to the haptic output. According to the second embodiment of the present disclosure, the processing of adding the echo effect in the information processing apparatus 100-2 becomes unnecessary, and it becomes possible to reduce computational resources and processing load of the information processing apparatus 100-2.

Hereinabove, although the preferred embodiments of the present disclosure have been described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, the above embodiments have shown the information processing system in which the delay time is stored in the storage unit 104 in advance; however, the present technology is not limited to this example. For example, the information processing system may measure the delay time. Specifically, the controller 200 additionally includes a measurement unit, and the measurement unit detects the time from the output start instruction on the haptic output to the occurrence of the output. Next, the communication unit 202 transmits the detected delay time to the information processing apparatus 100-1, and the communication unit 114 causes the received delay time to be stored in the storage unit 104. Then, the effect control unit 102 decides the echo amount by using the delay time stored in the storage unit 104. In this case, since an aged actuator tends to have a long delay time, by measuring the delay time, it becomes possible to handle a change in the delay time.

Further, in the information processing system of the above embodiments, examples in which the information processing apparatus 100 generates the haptic output signals have been described; however, the information processing apparatus 100 may transmit the haptic output instruction to the controller 200 and the controller 200 may generate the haptic output signals. In this case, it becomes possible to reduce computational resources and processing load of the information processing apparatus 100.

It should be noted that in the present disclosure, the operations described in the sequence diagram may be performed not only in time series in the described order but in parallel or individually. Further, it should be understood that the operations performed in time series may be performed in a different order from the described order.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing apparatus including:
    an effect control unit configured to control an echo effect that is to be added to an output;
    a sound output control unit configured to control a sound output according to occurrence of an event in a virtual space; and
    a haptic output control unit configured to control a haptic output to which the echo effect controlled by the effect control unit is added according to the occurrence of the event.

(2) The information processing apparatus according to (1),
    wherein the effect control unit controls the echo effect on the basis of a delay time from an output start instruction on the haptic output to occurrence of the output.

(3) The information processing apparatus according to (2),
    wherein the effect control unit increases or decreases an effect amount of the echo effect according to the delay time.

(4) The information processing apparatus according to (3),
    wherein the haptic output control unit decreases the haptic output when the delay time exceeds a certain threshold.

(5) The information processing apparatus according to (2) or (3),
    wherein the effect control unit decides presence or absence of the echo effect on the basis of the delay time and a certain threshold.

(6) The information processing apparatus according to (1),
    wherein the effect control unit decides an effect amount of the echo effect on the basis of a user's operation.

(7) The information processing apparatus according to any one of (1) to (3) or (7),
    wherein the haptic output control unit decreases the haptic output according to an effect amount of the echo effect.

(8) The information processing apparatus according to any one of (1) to (3),
    wherein the effect control unit decides an effect amount of the echo effect according to an output amount of the haptic output.

(9) The information processing apparatus according to any one of (1) to (8),
    wherein the sound output control unit controls a sound output to which the echo effect controlled by the effect control unit is added.

(10) An information processing system including:
    an effect control unit configured to control an echo effect that is to be added to an output;
    a sound output control unit configured to control a sound output according to occurrence of an event in a virtual space; and
    a haptic output control unit configured to control a haptic output to which the echo effect controlled by the effect control unit is added according to the occurrence of the event.

(11) The information processing system according to (10),
    wherein the effect control unit is provided in an information processing apparatus, and
    wherein the sound output control unit and the haptic output control unit are provided in an output apparatus.

(12) An information processing method including:
  controlling an echo effect that is to be added to an output;
  controlling a sound output according to occurrence of an event in a virtual space; and
  controlling a haptic output to which the echo effect is added according to the occurrence of the event.
(13) A program for causing a computer to execute:
  an effect control function of controlling an echo effect that is to be added to an output;
  a sound output control function of controlling a sound output according to occurrence of an event in a virtual space; and
  a haptic output control function of controlling a haptic output to which the echo effect controlled by the effect control function is added according to the occurrence of the event.

What is claimed is:

1. An information processing apparatus, comprising:
  an effect control unit configured to control an echo effect added to an output;
  a sound output control unit configured to control a sound output based on an occurrence of an event in a virtual space; and
  a haptic output control unit configured to control a haptic output to which the echo effect controlled by the effect control unit is added based on the occurrence of the event,
  wherein the effect control unit is configured to control the echo effect based on a delay time from an output start instruction for generation of the haptic output to an occurrence of the haptic output.

2. The information processing apparatus according to claim 1, wherein the effect control unit is further configured to increase or decrease an effect amount of the echo effect based on the delay time.

3. The information processing apparatus according to claim 1, wherein the haptic output control unit is further configured to decrease the haptic output based on a determination that the delay time exceeds a threshold.

4. The information processing apparatus according to claim 1, wherein the effect control unit is further configured to decide presence or absence of the echo effect based on the delay time and a threshold.

5. The information processing apparatus according to claim 1, wherein the effect control unit is further configured to decide an effect amount of the echo effect based on a user's operation.

6. The information processing apparatus according to claim 1, wherein the haptic output control unit is further configured to decrease the haptic output based on an effect amount of the echo effect.

7. The information processing apparatus according to claim 1, wherein the effect control unit is further configured to decide an effect amount of the echo effect based on an output amount of the haptic output.

8. The information processing apparatus according to claim 1, wherein the sound output control unit is further configured to control a sound output to which the echo effect controlled by the effect control unit is added.

9. An information processing system, comprising:
  an effect control unit configured to control an echo effect added to an output;
  a sound output control unit configured to control a sound output based on an occurrence of an event in a virtual space; and
  a haptic output control unit configured to control a haptic output to which the echo effect controlled by the effect control unit is added based on the occurrence of the event,
  wherein the effect control unit is configured to control the echo effect based on a delay time from an output start instruction for generation of the haptic output to an occurrence of the haptic output.

10. The information processing system according to claim 9,
  wherein the effect control unit is present in an information processing apparatus, and
  wherein the sound output control unit and the haptic output control unit are present in an output apparatus.

11. An information processing method, comprising:
  controlling an echo effect added to an output;
  controlling a sound output according to an occurrence of an event in a virtual space; and
  controlling a haptic output to which the echo effect is added according to the occurrence of the event,
  wherein the echo effect is controlled based on a delay time from an output start instruction for generation of the haptic output to an occurrence of the haptic output.

12. A non-transitory computer readable medium having stored thereon, computer-executable instructions for causing a computer to execute operations, the operations comprising:
  controlling an echo effect added to an output;
  controlling a sound output according to an occurrence of an event in a virtual space; and
  controlling a haptic output to which the echo effect is added according to the occurrence of the event,
  wherein the echo effect is controlled based on a delay time from an output start instruction for generation of the haptic output to an occurrence of the haptic output.

13. The information processing apparatus according to claim 1, wherein the echo effect added to the haptic output causes vibrations associated with the haptic output to be continued for a period of time after the haptic output is stopped.

* * * * *